United States Patent [19]

Sair et al.

[11] 3,978,236

[45] Aug. 31, 1976

[54] PROCESS FOR PRODUCING PUFFED PROTEINACEOUS FOOD PRODUCTS

[75] Inventors: Louis Sair, Evergreen Park; Donald W. Quass, Downers Grove, both of Ill.

[73] Assignee: The Griffith Laboratories, Inc., Chicago, Ill.

[22] Filed: Apr. 30, 1975

[21] Appl. No.: 573,366

Related U.S. Application Data

[60] Division of Ser. No. 77,720, Oct. 2, 1970, abandoned, which is a continuation-in-part of Ser. No. 750,025, Aug. 5, 1968, abandoned, which is a continuation-in-part of Ser. No. 349,735, March 5, 1964, Pat. No. 3,440,054.

[52] U.S. Cl. ............................... 426/445; 426/580; 426/634; 426/656; 426/438; 426/242
[51] Int. Cl.² ..................... A23L 1/01; A23L 1/20; A23J 3/00
[58] Field of Search ........... 426/445, 618, 580, 629, 426/438, 632, 634, 656, 242

[56] References Cited
UNITED STATES PATENTS

| | | | |
|---|---|---|---|
| 2,005,730 | 6/1935 | Dunham | 260/119 |
| 2,103,153 | 12/1937 | Dunham | 260/113 |
| 3,102,031 | 8/1963 | MacAllister et al. | 426/574 |
| 3,119,691 | 1/1964 | Ludington et al. | 426/99 |
| 3,139,342 | 6/1964 | Linskey | 426/293 |
| 3,142,571 | 7/1964 | McAnelly | 426/634 |
| 3,268,336 | 8/1966 | Hale et al. | 426/284 |
| 3,440,054 | 4/1969 | Sair | 426/99 |
| 3,480,442 | 11/1969 | Atkinson | 426/448 |

*Primary Examiner*—Raymond N. Jones
*Attorney, Agent, or Firm*—Merriam, Marshall, Shapiro & Klose

[57] ABSTRACT

Preparation of a puffed textured, proteinaceous food product involving subjecting water-moistened proteinaceous material to pressure and heat sufficient to cause the mix to convert to a hot, moist, plastic, extrudable, translucent to glassy mass and extruding the mass through and from a length of an elongated die under non-puffing conditions to provide a moisture-containing, translucent to glassy extrudate, and, as a separate and distinct operation, thereafter puffing the translucent to glassy product in a moist state by subjecting it to water-boiling puffing conditions.

4 Claims, No Drawings

PROCESS FOR PRODUCING PUFFED PROTEINACEOUS FOOD PRODUCTS

This application is a division of application Ser. No. 77,720, filed Oct. 2, 1970, now abandoned. Insofar as the specification of said application Ser. No. 77,720 discloses the invention or improvements of Louis Sair, it is a continuation-in-part of application Ser. No. 750,025, filed Aug. 5, 1968 and now abandoned, which, in turn, is a continuation-in-part of application Ser. No. 349,735, filed Mar. 5, 1964, which issued as U.S. Pat. No. 3,440,054 on Apr. 22, 1969. Application Ser. No. 561,909, filed by Louis Sair on Mar. 25, 1975, is a division of said application Ser. No. 77,720, and discloses and claims the invention or improvements of Louis Sair.

This invention relates to the preparation of puffed, proteinaceous food products, and the resulting products.

Referring first to U.S. Pat. No. 3,440,054, that patent as issued discloses, among other things, a process of preparing a puffed, proteinaceous food product which involves subjecting a moist (e.g., crumbly to free-flowing), hydrophilic proteinaceous material having a controlled or limited amount of water in the range of about 10.4 to 40 parts of water per 60 parts of solids to elevated mechanical pressure (e.g., laboratory Carver press or commercial rolls) to form a moisture-containing, compressed, translucent to glassy product. It should be noted, however, that the Certificate of Correction dated Jan. 23, 1973 corrected that patent by changing the foregoing 10.4 value of water to a 12.8 value. (This compression or compaction step inherently raises the temperature of the material.) More particularly, that patent concerns subjecting a hydrophilic protein, such as exemplified by soybean protein or casein (e.g., commercial casein at its isoelectric point and having about 6–12% moisture) or admixtures thereof, which had been or is reacted or neutralized with alkali metal hydroxide (e.g., NaOH) or alkaline earth metal hydroxide (e.g., Ca(OH)$_2$) to such mechanical pressure. The patent indicates that when the moist neutralized mass is mechanically compressed with pressure, it can be changed to a translucent to glassy form.

The patent also discloses that the compressed, translucent to glassy product may be subjected to drying (e.g., air drying), with or without denaturing the protein, to remove some of the moisture, and discloses puffing the translucent to glassy product by subjecting it to a waterboiling temperature (e.g., temperature well above 212°F.), thereby boiling residual moisture. The patent mentions, for example, that puffing may be conducted with either dry heat or by deep frying in fat. Furthermore, the patent states that the puffed product may be ground to a mass of porous particles. Still further, the patent points out that flavoring or other edible materials may be added to the hydrophilic protein material.

The foregoing process of the patent involves, although it is not expressly so stated, forming a compressed, translucent to glassy product then having, or having after being partly dried (e.g., air drying) and before being puffed, a continuous structure that resists the rapid or sudden release of moisture therefrom at elevated temperatures but, under water-boiling puffing conditions, allows for the build up of pressure in the product from moisture which, when rapidly or suddenly released from the product under water-boiling puffing conditions, causes the product to puff into an enlarged food product.

The patent discloses that when flavoring material is added to or is present with the hydrophilic protein material before or after forming flakes (with the application of pressure) and before or after drying, or after puffing, an edible snack is obtained by puffing either with dry heat or by deep-frying in fat. The patent notes that in deep-fat frying, an expansion of as much as about tenfold can be obtained. The patent mentions, for example, using only casein and neutralizing alkali, such as sodium hydroxide or calcium hydroxide, and flavoring material lacking in carbohydrates, an all-protein puffed snack may be produced. By introducing into the mass, before applying the mechanical pressure, a carbohydrate in the form of cane sugar, glucose, starch such as potato flour (processed or otherwise), or mixtures of carbohydrates, puffed snacks may be produced having varying ratios of protein to carbohydrate. When such puffed snacks are produced by deep-fat frying, a fat content may be added.

With respect to U.S. application Ser. No. 750,025, filed Aug. 5, 1968, now abandoned, that application (referred to herein as "the application") discloses that the desired moist, proteinaceous material, without neutralization, may be subjected to elevated mechanical pressure to yield or form a moisture-containing, coherent, translucent-glassy form. The application expressly characterizes the compressed product as having an enclosing "skin", when the compressed product is subjected to drying, and states that the compressed product may be puffed.

In referring to the "skin", the application expressly points out that the "skin" may be at the surface of the product or extend into the body thereof, and the product may include one or more additives provided such additives do not prevent the formation of the "skin." The application expressly mentions that the function of the "skin" is to allow the pressure of water vapor to build up to a puffing point when the product is heated, such as in hot oil, at a water-boiling temperature.

The application points out that the moist material may include casein such as commercial casein (isoelectric casein having a pH of about 4 and a moisture content of about 6–12%) in a powdered or comminuted form, and may or may not include a diluting edible solid or additive such as starch, wheat flour, soy protein, neutralized edible protein such as disclosed in U.S. Pat. No. 3,440,054, and seasoning or flavoring material.

Furthermore, the application indicates that a limited or small amount of water should be slowly added to and mixed with the protein material, with or without an additive.

The application states that the amount of water present in the moist mass to be subjected to pressure should be in the range of 10 to 40 parts of water to 60 parts of protein material (dry basis), and that when nonprotein material or additive such as starch or wheat flour is present, any additional water which may be used for or absorbed by such non-protein material and which is not available to the protein material should be excluded from that prescribed range of moisture used for the protein material.

The application points out that the elevated mechanical pressure of the compression step causes the protein material, with or without an additive, to become a plastic or viscous flowable mass, and that one may apply such pressure by feeding the moist proteinaceous material into the nip of compression rolls, or by subjecting such material to pressure between platens, or by feeding such material into an augured extruder in which the cross-section or form of the extrudate is predetermined. Such a compression step inherently raises the temperature of the material. The extrusion of string-like forms is indicated as being a preferred compaction procedure.

The application states that the moisture-containing, glassy form may, if desired, be denatured by heat, without harm to the ability to puff, and then so dried, as in air, to retain residual moisture for puffing.

The application discloses that the moisture-containing, compressed, glassy product can be puffed at a water-boiling temperature, for example, by immersion in hot oil, to form an edible snack.

Referring next to the present invention, that invention relates to a process, as well as resulting improved products, of preparing a puffed, proteinaceous food product which, if desired, can be used as a food supplement for humans. That process involves: subjecting moist (e.g., crumbly to free-flowing), hydrophilic proteinaceous or protein material (having protein material which may or may not theretofore be at least partly neutralized, or may or may not be reacted to an at least partly neutralized form) having a controlled amount of water to elevated mechanical pressure to form a moisture-containing, translucent to glassy product then having and having after being partly dried and before being puffed, continuous structure that resists the rapid or sudden release of moisture therefrom at elevated temperatures but, under water-boiling puffing conditions, allows for the build up of pressure in the product from moisture which, when rapidly or suddenly released from the product under water-boiling conditions, causes the product to puff; preferably, partly drying the translucent to glassy product; puffing the translucent to glassy product (regardless of whether or not the product was partly dried) under water-boiling conditions; and, if desired, subdividing the product before puffing or subdividing the puffed product.

The structured or textured, puffed product has good texture, water absorption or retention properties, and firmness in the essentially dry state and in water at room temperature, in boiling water, and when retorted. The terms "textured" or "structured" hereinafter sometimes refers to puffed proteinaceous products which, when hydrated, have the feel, firmness, structure, texture or bite qualities similar to natural food products, for example, such as meat, fish, poultry products, and the like, and puffed food products which are pleasing in the mouth of humans.

The hydrophilic protein materials which may be used in my process include commercial casein and vegetable protein material or defatted (solvent-extracted) oil seed protein material such as obtained from defatted soybean flakes or flour having a protein content (dry basis) of at least about 30% or, preferably, a protein content of at least about 70% (protein concentrate). Furthermore, if desired, such protein materials may be at least partly neutralized (e.g., with alkali metal or alkaline earth metal hydroxide) by one who uses my process or may already be in that form, so that it has a pH within the range, for example, of about 6 to 10.5.

When non-neutralized protein material is used, there is a tendency for the puffed product to be somewhat tougher or have somewhat less of an ability to absorb or retain water.

When one wishes to produce a bland, puffed proteinaceous product, which for many purposes is preferred, the protein material should be substantially or essentially pure and have a high protein content. Thus, when soy protein is used, it is desirable to use a bland, soy protein concentrate having a protein content of at least about 70% (on a dry basis), such as produced in accordance with U.S. Pat. No. 2,881,076, or a soy protein isolate. If one wishes to produce a puffed, proteinaceous food product which need not be completely bland, one may use proteinaceous materials of lower protein content.

If desired, the proteinaceous material may include, for some purposes, a desired, edible amount (e.g., preferably less than 50%) of a suitable cereal, starch, sugar, coloring material, seasoning or flavoring ingredient, or the like. Those materials may be present in or blended with the proteinaceous material before elevated pressure is applied. One may use, for example, wheat flour, corn starch, yellow corn flour, cane sugar, dextrose, and the like.

Furthermore, it has been found desirable to include an edible form of available calcium (e.g., calcium ions) in or with the proteinaceous material, at the time that material is subjected to elevated pressure, for purposes of imparting a sturdier structure (e.g., skeleton-like structure) to the puffed, textured proteinaceous product, so that the puffed product has a higher degree of firmness or chewiness when that product is in an essentially dry state that exists after puffing and when it is subjected to rehydration in boiling water. Although calcium tends to enhance the rehydrated texture of the puffed product in boiling water, good or satisfactory rehydrated firmness or chewiness can be obtained without it. The calcium may be incorporated into the proteinaceous material in the form of an edible calcium salt such as dicalcium phosphate dihydrate, calcium chloride, or the like without imparting an undesired flavor to the puffed proteinaceous product.

Still further, Zeolex 23A material (sodium silico aluminate product) may be included with the proteinaceous material for purposes of facilitating the free-flowing properties of that material prior to the application of elevated pressure by extrusion means. That addition also has been found to assist in the providing of a puffed product having fine cells and a fine texture.

A suitable soybean protein concentrate having at least about 70% protein may be prepared, for example, as shown in U.S. Pat. No. 2,881,076, by adjusting the pH of defatted soybean material to the vicinity of the isoelectric point, followed by extensive washing with water to remove retained beany taste or flavor conferring constituents. The resulting soy protein concentrate has a minimal level of undesired beany taste or flavor, odor and color.

More specifically, U.S. Pat. No. 2,881,076 describes a process for preparing or recovering an improved soy protein concentrate which requires that soybean material, for example, in the form of deoiled or defatted soybean flour or flakes, be subjected to the dissolving action of water having a pH in the vicinity of the isoelectric pH of the protein content of the soybean material, and that the insoluble solids in the form of an essentially insoluble slurry (e.g., cake) be separated from the resulting solution. The insoluble solids are then washed. The purpose of these steps is to remove undesired, characteristic beany taste or flavor, odor and color conferring ingredients. A preferred embodiment involves neutralizing the insoluble, soy protein material by adding an edible, alkaline agent (e.g., sodium hydroxide) to the insoluble protein slurry to raise its pH within the range of about 5.5 to 10.5, preferably within the range of about 6 to 8. The resulting protein concentrate slurry may be dried (e.g., spray-dried).

By utilizing the process of U.S. Pat. No. 2,881,076, the soluble sugars and nitrogen-containing materials soluble in the vicinity of the isoelectric pH, and characteristic beany taste or flavor, odor and color conferring materials are removed, which results in a soy protein concentrate product having a protein content, on a dry basis, of about 70% or more. Such a concentrate product has a bland taste, light color, and when suspended in water, developes viscous dispersions having good emulsifying and water-binding properties, particularly in emulsified meat products.

The proteinaceous material is in a substantially uniform, moist (e.g., crumbly to free-flowing) state and has a controlled, effective amount of water when it is subjected to effective mechanical pressure. The moist material must be subjected to treatment under conditions, including sufficient elevated mechanical pressure, which result in that material being transformed into a workable, substantially homogeneous, deformable, flowable, coherent plastic mass which forms a moisture-containing, translucent to glassy product that is not puffed as a result of that treatment and has thermoplastic characteristics. It is preferred that essentially all of the moist proteinaceous material be transformed into the translucent to glassy product. Furthermore, the translucent to glassy product must retain some of its moisture until the product is later puffed in a separate and distinct operation.

The amount of water present during the application of elevated mechanical pressure, the nature of the proteinaceous material, the conditions of temperature, pressure and time used in connection with the compaction operation, the nature of the particular equipment used for applying elevated pressure, and the particular characteristics sought (e.g., fine or coarse cells or texture) as a result of the later, separate puffing step, are interrelated and should be coordinated. Thus, when one operating condition is varied or selected, that condition in turn can influence the other desired operating conditions.

It has been found, for example, that if too high a temperature is reached or applied during the application of elevated pressure or the material is subjected to too high a temperature during the formation of the translucent to glassy product, the proteinaceous material has a tendency to discolor or develop a flavor as a result thereof (characteristics which are undesired when a bland, natural-colored, puffed product is sought) and the later produced puffed product has a greater tendency to lose its firmness when it is rehydrated in boiling water. The use of too low a temperature during compaction can prevent one from producing the desired translucent to glassy product or later result in producing a puffed product that is rather tough when rehydrated or has lower water absorption or water retention properties in boiling water.

The application of elevated mechanical pressure to the proteinaceous material tends to increase the temperature of that material. When even below water-boiling temperatures accompany the application of mechanical pressure (e.g., compaction rolls), such conditions may yet be sufficient to form the above referred to plastic mass and translucent to glassy product with casein protein material.

However, when protein materials such as soy protein is used, it may be necessary to apply external heat to the proteinaceous material in conjunction with the application of elevated pressure for the purpose of forming a plastic mass which is transformed into a translucent to glassy product, and in such instances the application of mechanical pressure should be conducted in a system (e.g., extruder) that is closed during operation so as to obviate the loss of moisture from the material or system. In order to avoid simultaneously puffing the compacted material (subjected to a water-boiling temperature) when a flowable mass is discharged or ejected from the system into a medium of lower pressure or unconfined zone at atmospheric pressure, it is necessary to cool (e.g., temper) the mass or reduce its temperature to below water-boiling temperatures before the material is discharged or ejected from the system.

The controlled amount or concentration of water present in or with the proteinaceous material which is subjected to elevated pressure and requisite temperature conditions must be sufficient to facilitate converting that material to a plastic state which forms the translucent to glassy product. For most purposes, it has been found that the use or presence of water in the range of approximately 12.8 to 40 parts of water per 60 parts of solids or approximately 10 to 40 parts of water per 60 parts of dry protein or proteinaceous material (regardless of whether or not the water is wholly or partly present as added water) is satisfactory when conventional compaction rolls or, with certain materials, conventional extruders are used. It has been found, for example, that it is desirable to use a sufficient water within the range of about 10 to 50%, preferably within the range of about 25–45% water, in order to work the material satisfactorily in a conventional extruder and obviate discoloring the material or forming flavor conferring material. When calcium is present with or in the protein material, such as a soy protein concentrate, it may be desirable, for some purposes, to use a relatively high level of water (e.g., within the range of about 40–45%) to increase the water absorption or water retention properties of the puffed product when it is rehydrated in boiling water.

A variety of devices may be used to apply mechanical pressure. One may use, for example, a press (e.g., Carver press), commercial rolls or pellet mill, or extruder (e.g., Prodex extruder or Brabender extruder) which subjects the moist proteinaceous material to sufficient pressure and temperature and forms a product of desired size and shape (e.g., sheets, discs, pellets, rods, strings or bars). When an extruder is used, it is essential not to discharge or eject the extrudate under water-boiling conditions or temperatures, so that extrusion does not subject the material to simultaneous puffing which normally results from the rapid or sudden release of water vapor from the mass when or as the discharged or ejected extrudate enters a zone of lower pressure. Thus, if such pressures or temperatures are developed prior to the discharge or ejection of the plastic material through the restricted extrusion die, nozzle or orifice which would cause the issuing or issued extrudate to rapidly release water and puff, it is critical to reduce the temperature of the plastic mass so that it is not discharged or ejected under water-boiling or puffing conditions. The pressure differential across the die, nozzle or orifice thus must not cause the extrudate to puff.

Although a variety of injection molding machines, and thermoplastic extrusion and compression molding machines may be used in the forming of the plastic mass, one can advantageously use a heatable extruder having a rotating compression or compaction screw within a closed heatable barrel and temperature controllable, restricted extrusion die or orifice at the front end of the barrel. The barrel, in conjunction with the compression or compaction screw, creates, during operation, a closed chamber which prevents the release of existing water vapor from the material and system. The rotating screw builds up sufficient pressure to cause the plastic mass to be pushed at the desired temperature and pressure to and through a die or orifice. It is critical that the compressed, flowable material not be discharged or ejected from the extruder under water-boiling or puffing conditions for the reasons explained above. Therefore, it may be necessary to reduce the temperature of the plastic mass in the extruder by using a cooling or tempering operation or step immediately before discharging or ejecting the extrudate from the extruder. The temperature of the plastic mass may be reduced, in the extruder, for example, by using an extruder having an elongated nozzle or extension which communicates with the restricted die or orifice opening and from which the extrudate is ejected or discharged in the desired configuration (e.g., as an unpuffed, rod, ribbon or string) under atmospheric conditions. The extension, for example, may be air-cooled or may include a jacket through which cooling fluid (e.g., water) may be circulated.

In the event one wishes to produce a puffed product having a relatively coarse texture, relatively large cells, and which has more of a tendency to become soft when rehydrated in boiling water, which properties may be acceptable for making snacks, then the translucent to glassy product may be puffed in a separate and distinct operation without first being partly dried.

The grain or cell structure of the textured, puffed food product is related to the puffing conditions used and the moisture content of the translucent to glassy product. Since such textured food products will simulate or be used in or with a wide variety of foods, it is difficult to single out the "best" operating conditions. Generally, it has been found that finer cells result from the puffing operation when the translucent to glassy product to be puffed has a relatively low moisture content. The moisture content of the translucent to glassy product can be reduced to the desired moisture level (e.g., preferably up to or below about 20%, or within the range of about 10–20%) by conventional means (e.g., air drying). One may partly dry the moisture-containing, translucent to glassy material, for example, with air at room temperature or hot circulating air at a temperature within the range of about 120°–200°F., preferably within the range of about 130°–150°F.

The translucent to glassy product, regardless of whether or not it has been partly dried, has continuous structure that resists the rapid or sudden release of moisture therefrom at elevated temperatures but, under water-boiling puffing conditions, allows for the build up of pressure in the product from moisture which, when rapidly or suddenly released from the product under water-boiling puffing conditions (e.g., at a water-boiling temperature), causes the product to puff or to be texturized.

The puffing step involves subjecting the moisture-containing, translucent to glassy product (regardless of whether or not it has been partly dried) to water-boiling conditions. This may be conducted, for example, with hot air (e.g., at about 400°–600°F.), deep fat frying (e.g., at about 400°F.), with microwave heating, with a puffing gun such as used in puffing cereals, or with hot sand. The puffing operation expands the product (e.g., about 3 to 10-fold or more in volume as compared with the volume of the translucent to glassy product as it exists prior to puffing) and produces an expanded, structured, textured, porous product having cells formed by the sudden release of moisture. It is desirable to conduct the puffing step under conditions (e.g., moisture, time and temperature conditions) which obviate the development of undesired taste or flavor or discoloration. Furthermore, the puffing step should be conducted under conditions which cause substantially all of the translucent to glassy product to puff substantially uniformly.

One may, if desired, dry the puffed product to a desired residual moisture content.

The puffed product, on contact with boiling water, has good stability, is chewy, resists disintegration, and does not become soft and mushy. In addition, the puffed product can have a high bulk specific volume (e.g., at least about 4 cc./gm.). Still further, the puffed product is significantly different from the product which results from merely swelling an unpuffed, translucent to glassy product by contacting it with hot water.

The translucent to glassy product may be subdivided (e.g., cut or ground), as desired, before it is partly dried, after it has been partly dried, or before or after it has been puffed.

It has been found that by producing a moisture-containing translucent to glassy product that is later puffed in a separate and distinct operation, as described above, one can produce a puffed textured product which, when rehydrated in boiling water, yields a structure, for example, simulating muscle or stratified muscle tissue found in natural meat or poultry products. Thus, the textured or structured product of this invention can have the bite, texture and histological characteristics of muscle.

It should be further noted that if one takes the puffed, structured or textured product of Test 2 (see Table XX) of Example 34 below and retorts that puffed food product using conventional retorting conditions (10 grams of the puffed product is placed in a 3-oz. can, the can is filled with hot water and then is sealed, and the contents are retorted at about 230°F. for about 60 minutes), the resulting puffed food product greatly resembles cooked mushrooms and has the bite and tenderness and fine-grained texture of cooked mushrooms.

The examples which follow are intended, among other things, to illustrate the relationship of and results effected by varying the nature or contents of the proteinaceous material, level of added water, compaction or mechanical pressure conditions, temperature conditions, partial drying conditions and puffing conditions, but it is understood that the examples are set forth for illustrative purposes. All parts and percentages expressed in the examples, as well as elsewhere herein, are on a weight basis unless otherwise specified.

EXAMPLES 1-10

Examples 1-10 having the compositions shown in Table 1 below are prepared. These examples differ only in the amount of added water present.

TABLE I

| | Amount of Materials | | |
|---|---|---|---|
| Example No. | Gms. of Commercial Casein from New Zealand (30-Mesh) | Ml. of 50% NaOH solution | Ml. of Added Water |
| 1 | 100 | About 4 | 0 |
| 2 | 100 | About 4 | 3 |
| 3 | 100 | About 4 | 6 |
| 4 | 100 | About 4 | 12 |
| 5 | 100 | About 4 | 24 |
| 6 | 100 | About 4 | 30 |
| 7 | 100 | About 4 | 35 |
| 8 | 100 | About 4 | 40 |
| 9 | 100 | About 4 | 50 |
| 10 | 100 | About 4 | 60 |

In preparing each of Examples 1-10, the added water is added to the commercial casein. then the 50% NaOH solution is added to and admixed with the moist mass.

Table II below shows the results of applying mechanical pressure to each of the compositions of Examples 1-10. Column 1 of Table II identifies the number of the Example. Column 2 shows the amount of added water present in each of Examples 1-10. Column 3 shows the water content of each Example (before compaction) as determined by oven-drying a sample at about 100°C. overnight in order to cause the loss of all water. Column 4 shows the visual characteristics of Examples 1-10 after the forming of pellets at 15,000 psi. mechanical pressure for 5 minutes (at room temperature) in a laboratory Carver press.

TABLE II

| (1) Example No. | (2) Ml. of Added H$_2$O | (3) Percent H$_2$O Released after Oven-Drying | (4) Compressed Pellet |
|---|---|---|---|
| 1 | 0 | 13.3 | White, opaque. |
| 2 | 3 | 15.3 | " |
| 3 | 6 | 17.4 | " |
| 4 | 12 | 21.3 | White, opaque, slight translucency in spots. |
| 5 | 24 | 27.9 | " |
| 6 | 30 | 31.8 | About 60% white, opaque with remainder being translucent. |
| 7 | 35 | 33.8 | About 10% opaque, about 90% translucent. |
| 8 | 40 | 37.0 | About 99% translucent, about 1% opaque. |
| 9 | 50 | 40.0 | About 100% translucent, very hard pellet. |
| 10 | 60 | 44.0 | About 100% translucent and the pellet is softer than the sample of Example 9. |

At a given compaction temperature, the degree of pressure applied to the moist or semi-dry neutralized protein determines in part the amount of water required to obtain the glassy product from a neutralized protein material; likewise, at a given compaction temperature, the degree of moisture present determines in part the level of pressure required. Table II above shows that under the particular conditions used, about 35 ml. of water for 100 gms. of casein are required to obtain translucency.

With materials and conditions used in Examples 15-17 below, translucency can be obtained with considerably less water.

EXAMPLES 11-14

The compositions shown in Table III below, which differ only in the amount of added water present, are prepared.

TABLE III

| | Examples | | | |
|---|---|---|---|---|
| Materials | Example 11 | Example 12 | Example 13 | Example 14 |
| Casein (30-Mesh) from Australia with About 8.78% Moisture | 100 gms. | 100 gms. | 100 gms. | 100 gms. |
| 50% Sodium Hydroxide Solution | 3.5 ml. | 3.5 ml. | 3.5 ml. | 3.5 ml. |
| Added Water | 20 ml. | 25 ml. | 30 ml. | 40 ml. |

Each of these compositions (i.e., Example 11-14) is compacted at 15,000-16,000 psi. in a laboratory Carver press having a die that is heated to the various temperatures shown in Table IV below and that forms about 10-gram pellets. Table IV shows the appearance of the various compacted pellets.

TABLE IV

| | | Appearance of Compacted Pellet Formed at Different Temperatures | | | | |
|---|---|---|---|---|---|---|
| Example No. | Ml. of Added Water | 25°C. | 58°C. | 82°C. | 100°C. | 156°C. |
| 11 | 20 | Opaque, Crumbly | Opaque, Crumbly | Opaque, Crumbly | Opaque | About 25% Glassy |
| 12 | 25 | Opaque | Opaque | About 20% Glassy | About 50% Glassy | About 80% Glassy |
| 13 | 30 | About 10% Glassy | About 50% Glassy | About 90% Glassy | About 95% Glassy | About 99% Glassy |
| 14 | 40 | About | About | About | About | About |

TABLE IV-continued

| Example No. | Ml. of Added Water | Appearance of Compacted Pellet Formed at Different Temperatures | | | | |
|---|---|---|---|---|---|---|
| | | 25 C.° | 58 C.° | 82 C.° | 100 C.° | 156 C.° |
| | | 50% Glassy | 90% Glassy | 99% Glassy | 100% Glassy | 100% Glassy |

Table IV above indicates that the use of higher temperatures or a mix with higher moisture content can facilitate the formation of a glassy product.

EXAMPLES 15–17

The composition of Examples 15–17 shown in Table V below include hydrophilic proteinaceous materials which differ only in the amount of added water present. Example 15 is a free-flowing mass; Example 16 is essentially free-flowing; Example 17 has somewhat gluey characteristics.

TABLE V

| Materials | Parts by Weight of Materials Before Compaction | | |
|---|---|---|---|
| | Example 15 | Example 16 | Example 17 |
| Commercial Dry Casein | 100 | 100 | 100 |
| 50% NaOH Solution | | | |
| NaOH | 1.67 | 1.67 | 1.67 |
| Water | 1.67 | 1.67 | 1.67 |
| Added Water | 2.61 | 7.85 | 13.05 |

In preparing each of Examples 15–17, the water is added to the commercial casein and mixed therewith for 10 minutes until the product changes from a moist to free-flowing state. Then the alkali is added thereto and mixed therewith for 10 minutes. Then the product is immediately passed through heavy squeeze rolls which form sheets. It has been found that compacting the mass before neutralization is complete hastens the reaction. The characteristics of sheets formed with the compositions of Examples 15–17 have the characteristics shown in Table VI below.

TABLE VI

| Characteristics of Sheets | |
|---|---|
| Example 15 | Opaque |
| Example 16 | Spotted Opaque - Translucent |
| Example 17 | Translucent - Glassy |

The sheets are dried in an air stream to about 7% moisture content and ground to pass through an 80-mesh screen. The properties of the ground products are as shown in Table VII below.

TABLE VII

| Example No. | pH | Percent Moisture | Percent Protein | Comparative Viscosity in Centipoises |
|---|---|---|---|---|
| 15 | 6.9 | 6.2 | 89.0 | 190 |
| 16 | 6.8 | 8.0 | 88.5 | 550 |
| 17 | 6.8 | 8.3 | 86.8 | 1,450 |
| Control[1] | 7.0 | 4.2 | 89.7 | 270 |

[1]A commercial spray-dried sodium caseinate.

The variation in viscosity values shown in Table VII above shows how neutralized casein can be varied by varying the moisture content of the product in the moist or semi-dry state and as the protein material subjected to mechanical pressure is converted to an opaque to translucent sheet.

The three products of Examples 15 to 17 are compared with a commercial spray-dried sodium caseinate product (control) by using the products as emulsifiers in a comminuted meat product. They compare as follows:

Example 15 — Inferior
Example 16 — Superior
Example 17 — Superior

The superior emulsifying properties of Examples 16 and 17 are related to their higher viscosity characteristics.

EXAMPLES 18–21

The sodium caseinate product of Example 18 is prepared with the materials shown in Table VIII below.

TABLE VIII

| Materials in Example 18 | Parts by Weight |
|---|---|
| Commercial New Zealand Casein | 100 |
| Added Water | 30 |
| NaOH Solution | |
| NaOH | 2.5 |
| Water | 2.5 |

In preparing the sodium caseinate product of Table VIII above, the added water is mixed with the casein until a free-flowing mass is obtained. Then one-half of the sodium hydroxide solution is added and the mix is stirred to produce a damp, non-sticky swollen mass which changes in about 30 minutes to a free-flowing mass. Then the remainder of the alkali solution is added and the mix is stirred until a free-flowing mass is formed. The product is then compacted under heavy mechanical pressure (compaction rolls) to form an almost glassy mass which is dried (140°F. for 8 hours) and ground.

A sausage formulation is prepared with the ingredients of Table IX below.

TABLE IX

| Materials | Parts by Weight |
|---|---|
| Lean Beef | 20 lbs. |
| Defatted Beef Hearts | 20 lbs. |
| Pork Back Fat | 60 lbs. |
| Chipped Ice | 40 lbs. |
| Sodium Chloride | 2.5 lbs. |
| Curing Salt | 0.25 lbs. |
|   Sodium Chloride, 90% | |
|   Sodium Nitrite, 6% | |
|   Sodium Nitrate, 4% | |
| Sodium Erythorbate | 7/8 oz. |
| Seasoning | 8 oz. |

3.5 lbs. of each of the glassy sodium caseinate product of Example 18 and a commercial spray-dried sodium caseinate are added as a meat emulsifier to separate batches of the sausage formulation of Table IX above to form the sausage emulsions of Examples 19 and 20, respectively, and the sausage formulations of Table IX above, without any added caseinate, is used as a control and is designated as Example 21. A comparison of the differences between these three sausage products is shown in Table X below.

TABLE X

| | Materials |
|---|---|
| Example 19 | Sausage Formulation of Table IX with glassy sodium caseinate of Example 18. |
| Example 20 | Sausage Formulation of Table IX with commercial spray-dried sodium caseinate. |
| Example 21 | Sausage Formulation of Table IX without any sodium caseinate product. |

The three sausage emulsions of Examples 19–21 are stuffed into 12-oz. oblong cans which are sealed. The cans are subjected to cooking at 160°F. for 90 min., chilled for about 1 hour, and placed in a cooler at 38°F. The cans are opened the next day and the percent of purged juices (juices lost) are determined and the values shown in Table XI below are obtained.

TABLE XI

| | Weight % Purge |
|---|---|
| Example 19 | 3.19 |
| Example 20 | 5.86 |
| Example 21 | 19.78 |

Table XI above shows that the glassy sodium caseinate used in Example 19 is a better emulsifier than the commercial spray-dried sodium caseinate used in Example 20, and the use of Example 21, without any caseinate emulsifier, results in more purge than obtained with either of Examples 19 and 20.

The opaque sodium caseinate product of Example 15 is included in a similar test and the purge is 11%. This is an improvement over the results one obtains with Example 21, but it is a product having poorer emulsifying properties than the commercial spray-dried sodium caseinate of Example 20 and the glassy form of sodium caseinate of Example 19.

EXAMPLE 22

When the neutralized hydrophilic protein is heated at a denaturing temperature, after adding the alkali and in the presence of free water and before completing the drying step, its viscosity, solubility and hydration properties are changed. Such denatured sodium caseinates make excellent protein supplements for some food products.

The composition shown in Table XII below is prepared.

TABLE XII

| Materials | Parts by Weight |
|---|---|
| Casein | 100 |
| Added Water | 30 |
| Ca(OH)$_2$ (dry powder) | 2.9 |

In preparing the composition of Table XII above, water is first mixed with the casein. After 20 minutes, the calcium hydroxide, as a dry powder, is added, followed by additional mixing. The mass is then mechanically compressed forming somewhat glassy pellets.

When these pellets are dried at a low temperature to 6–8% water and then ground, a caseinate is obtained which is much like commercial spray-dried calcium caseinate. When the pellets are dried at 180°F., the protein is denatured and its solubility is thereby reduced. The resulting product exhibits little hydration and makes an excellent protein supplement for some food products such as crackers and the like.

When calcium caseinate is made in the conventional way by adding calcium hydroxide to a suspension of casein in water to elevate the pH to 8 at 20% solids, the suspension can be boiled for 60 minutes without substantially denaturing the protein.

EXAMPLE 23

The composition of Table XIII below is prepared.

TABLE XIII

| Materials | Parts by Weight |
|---|---|
| Commercial Casein | 100 |
| Defatted Wet Soybean Protein[1] (About 70% Protein Content on Dry Basis) | 100 |
| Defatted Spray-Dried Neutralized Soybean Protein (About 70% Protein Content on Dry Basis)[2] | 170 |
| Calcium Hydroxide (dry) | 3 |

[1]A wet cake of 30% solids at pH 4, an undried, undenatured, unneutralized product of U.S. Patent 2,881,076.
[2]Dried product of U.S. Patent 2,881,076 neutralized with NaOH.

The water of the wet soybean protein serves to hydrate the mixed proteins before the dry calcium hydroxide is added. The mixed product is pressed into pellets and dried at a denaturing temperature of 180°F. to yield or form an insoluble protein food additive. By further processing, an edible article may be produced.

By subjecting the neutralized or incompletely neutralized protein to sufficient temperature and pressure to form flakes having substantially all or at least some portions thereof with the glassy or translucent form, as between rolls, and drying the flakes, the flakes have another useful characteristic. By heating the dried flakes, denatured or not, at a temperature well above 212°F., the glassy or translucent portions puff by boiling the residual moisture. With dry-puffing heat, a porous puffed flake is formed which can be used in the chunk form or ground to a mass of porous particles. Thus, by this procedure and selecting the protein, a new form of calcium or sodium salt of casein or of soy protein, or mixtures thereof, can be produced for use with food products.

EXAMPLE 24

The composition shown in Table XIV below is prepared.

TABLE XIV

| Materials | Amount |
|---|---|
| Commercial Casein from Australia with about 8.78% Moisture | 63 lbs. |
| Added Water | 31.5 lbs. |
| Dicalcium Phosphate Dihydrate | 5.4 lbs. |

In preparing the composition shown in Table XIV above, the casein and about one-half of the added water are mixed in a Hobart mixer until a substantially uniform composition is obtained. The dicalcium phosphate dihydrate is suspended in the remainder of the added water and that admixture is added to the Hobart mixer and mixing is continued until a substantially uniform composition is obtained.

The composition is compacted in a Brabender extruder using a 1:1 transfer screw at 60–70 rpm. and having a barrel heated to about 60°–80°C. The die has an opening of about 1/32-inch diameter and is heated to a temperature of about 60°–70°C.

The extruded denatured product is air-dried and has about 90–91% protein (dry basis).

The partly dried composition is puffed either with hot air at a temperature of about 550°F. or by immersion in hot oil at a temperature of about 400°F.

The resulting puffed, proteinaceous protein material has small cells, is porous, and has a good texture and good bite characteristics.

EXAMPLES 25–31

The mixes of Examples 25–31, which follow, contain, among other things, casein having about 7.6% of moisture, added water, and, in some instances, sodium or calcium caseinate, soybean protein or sodium salt thereof, yellow corn flour, or wheat flour. The ingredients of each mix are well mixed to form a moist, crumbly mix which is then subjected to various conditions of mechanical pressure and temperature to form a moist, compressed translucent-glassy product, the conditions required being dependent upon the composition of the mix.

Example 25

|  | Parts by Weight |
|---|---|
| Casein | 100 |
| Added Water | 15 |

Example 26

|  | Parts by Weight |
|---|---|
| Casein | 100 |
| Wheat Flour | 100 |
| Added Water | 70 |

Example 27

|  | Parts by Weight |
|---|---|
| Casein | 100 |
| Sodium Caseinate | 100 |
| Added Water | 50 |

Example 28

|  | Parts by Weight |
|---|---|
| Casein | 100 |
| Calcium Caseinate | 50 |
| Added Water | 30 |

Example 29

|  | Parts by Weight |
|---|---|
| Casein | 100 |
| Defatted Soy Protein[1] | 100 |
| Added Water | 80 |

[1]Unneutralized product of U.S. Patent 2,881,076.

Example 30

|  | Parts by Weight |
|---|---|

-continued

| Casein | 100 |
| Sodium Salt of Defatted Soy Protein[1] | 100 |
| Added Water | 100 |

[1]Product of U.S. Patent 2,881,076.

Example 31

|  | Parts by Weight |
|---|---|
| Casein | 100 |
| Yellow Corn Flour | 100 |
| Added Water | 150 |

EXAMPLE 32

It should be noted that since commercial casein or sodium caseinate can be subjected to mechanical pressure at a temperature below water-boiling temperatures to form a moist, compressed glassy extrudate, the compacted product need not be cooled before extruding in order to avoid simultaneous puffing the product upon ejection into the atmosphere or zone of lower pressure. However, unneutralized or neutralized soy protein material should be subjected to a higher temperature, as well as mechanical pressure, to form a moist glassy extrudate; in order to avoid simultaneous puffing, such temperature conditions require that that material be cooled to below a water-boiling temperature before it is ejected or issued from the extruder as an extrudate.

Compositions "A" and "B" shown in Table XV below are prepared with and without dicalcium phosphate dihydrate, respectively.

TABLE XV

| Materials | Composition "A" | Composition "B" |
|---|---|---|
| Defatted Soy Flour (Staley I 200, 99% Through 100-Mesh, 95% Through 200-mesh, About 7% Moisture) | 500 gms. | 500 gms. |
| Zeolex 23A[1] | 5 gms. | 5 gms. |
| Dicalcium Phosphate Dihydrate | — | 10 gms. |
| Added Water | 240 ml. | 240 ml. |
| 50% Solution of Sodium Hydroxide | 2.2 ml. | 2.2 ml. |

[1]Sodium silico aluminate product which facilitates free-flowing qualities prior to compaction and assists in forming a fine texture in the puffed product.

Each of compositions "A" and "B" of Table XV above is well mixed, contains about 37% moisture, has a pH of about 7.3, and is fed to a laboratory Brabender extruder using a 3:1 compaction screw which rotates at 35 rpm. and having a heated barrel temperature of 130°C. and a die temperature of 170°C. The barrel is heated with circulating hot oil which is fed to a jacket which surrounds the barrel. The die has a restricted extrusion opening and is heated by electrical means. The material which is fed through the die of the extruder is fed directly into a connected or communicating tubular die extension or elongated nozzle which is about 6 inches long and has an inner diameter of about 3/16-inch. The extension has a surrounding water jacket through which cooling tap water is circulated (after the start-up) at a rate of 0.8 gal. per hour. The amount of cooling water used is sufficient to prevent puffing.

The resulting proteinaceous material ejected from the extension is a moist, non-puffed, glass-like, rod-shaped extrudate.

Puffing of the moist glassy product immediately after extrusion (no intermediate partial drying step) yields a coarse open structure which is considered undesirable for some purposes.

A sample of the above-described, moist glassy extrudate is dried in a circulating air oven at 180°F. to reduce the moisture content of the extrudate to about 13%.

Each of Compositions "A" and "B" are then puffed using a microwave for 30 seconds in a microwave oven (Model 1800 SWD of Litton Industries, Inc. rated at 2450 megacycles, 2 magnetrons, 240 volts, 25 amps), during which time there is about a five-fold to ten-fold expansion in overall volume of the partly dried product (as compared with the unpuffed state).

The puffed products are then cracked to chunks about ½ inches long, which are comparable in size to a commercially available textured, soy protein product (known as "TVP" product) which is made by subjecting moist proteinaceous material to great mechanical pressure and heat, followed by simultaneous puffing upon ejection from the extruder into a zone of lower pressure.

Each of the three textured proteinaceous products is then checked for water absorption by suspending a 10-gram sample thereof in 150 ml. of boiling water for 10 minutes. This step involves rehydration and some cooking of the products. The water absorption is determined and the texture or biting quality is evaluated. The results are shown in Table XVI below.

TABLE XVI

| Sample | % Water Absorption | Rehydrated Texture |
| --- | --- | --- |
| Extruded Soy Flour without Dicalcium Phosphate Dihydrate (Composition "A") | 278 | Rather Firm and Chewy |
| Extruded Soy Flour with Dicalcium Phosphate Dihydrate (Composition "B") | 248 | Quite Firm and Slightly Rubbery |
| Commercial Textured Vegetable Protein Made by Immediate Expansion from Extruder ("TVP" Product) | 341 | Very Soft and Mushy |

The water absorption values in Table XVI above are calculated on the basis of pounds of water taken up per pound of added material; that is, the water absorption value of 248% means that 1 lb. of the textured proteinaceous product holds 2.48 lbs. of water. When rehydrated in this manner, the "TVP" product has a higher water absorption value than Compositions "A" (without dicalcium phosphate dihydrate) and "B" (with dicalcium phosphate dihydrate), but the "TVP" product becomes very soft and has substantially no textured character for use in a food product. In contrast, the use of dicalcium phosphate dihydrate in forming Composition "B" reduces the water absorption of the textured proteinaceous material, but improves the texture of the proteinaceous material after boiling.

The water absorption properties can be readily controlled. By increasing the moisture content of the material in the Composition "B" mix to up to 41%, prior to extrusion, and by following the same compaction, drying and puffing procedure, the water absorption is increased to 300%. When this product is placed in boiling water, as described above, it is found that the product has a firmer textured structure and superior eating or biting qualities than the "TVP" product puffed directly from the extruder.

The water absorption properties of a textured protein made using defatted soy flour can be raised to levels as high as 600%, depending on the initial moisture content of the mix, the additives present, the temperature of cooking in the extruder, the procedure used for treating or handling of the glassy extrudate, and the method of puffing. Water absorption in itself is not considered in this example as being as important as the rehydrated structure or texture of the puffed product when the puffed product is subjected to the normal cooking process used in the preparation of various foods.

EXAMPLE 33

The composition shown in Table XVII below is well mixed.

TABLE XVII

| Materials | Amount |
| --- | --- |
| Neutralized Defatted Soy Protein Concentrate[1] | 7 lbs. |
| Zeolex 23A | 64 gms. |
| Dicalcium Phosphate Dihydrate | 64 gms. |
| Added Water | 3.5 lbs. |

[1]Neutralized with NaOH, has a pH of 7–7.1, has about 4–5% moisture, and is made in accordance with U.S. Patent 2,881,076.

The composition of Table XVII above has about 33.7% moisture. The product is extruded through a laboratory Brabender extruder as described in Example 32 above using a 3:1 compaction screw which rotates at 95 rpm. By operating the compaction screw at 95 rpm., there is a minimal contact period of the material in the extruder, and, as a result, the resulting product is blander. The barrel is heated to 130°C. and the die is heated to the temperatures indicated in Table XVIII below; however, the connected or communicating pipe extension is air- cooled (after the start-up), is about 8 inches long and about 6 inches of the outer end of the pipe has been flattened to eject an extrudate in the form of a ribbon about ½-inch wide and about ⅛-inch high. The ejected, ribbon-shaped extrudate is a non-puffed, glass-like extrudate. The product is extruded through the heated die at various temperatures, as shown in Table XVIII below, followed by drying at 150°F. to a moisture content of about 15% and puffing the partly dried product using a microwave oven as described in Example 32 above for 25 seconds. The results are shown in Table XVIII.

TABLE XVIII

| Die Temperature of the Extruder | % Water Absorption | Rehydration Texture | Bulk Specific Volume (cc/gm.) |
| --- | --- | --- | --- |
| 135°C. | 232 | Very Tough | 3.35 |
| 150°C. | 350 | Firm - Very Good | 5.0 |
| 165°C. | 464 | Less Firm - Good | 7.08 |

When the die temperature of the extruder is too low, which in this case is 135°C., the water absorption of the puffed proteinaceous material (not completely glassy and hence not completely puffed) is comparatively low and the product, on cooking in boiling water as described in Example 32 above, is quite tough. By raising the die temperature to 150°C., the water absorption properties increase and the product, on cooking, has an excellent, firm-biting texture. By using a die temperature of 165°C., the water absorption value increases, but in so doing the finished product loses some of its firm eating qualities when placed in boiling water.

It is noted that the commercial "TVP" product made with immediate expansion from the extruder has a bulk specific volume of approximately 1.62 cc./gm. This bulk specific volume is well below the values shown in Table XVIII and well below the preferred range of about 4–8 cc./gm. The water absorption properties of the "TVP" product is about 345%, which is comparable to the product of this example which is heated to 150°C., but the texture of the cooked rehydrated "TVP" product is considered much inferior in that it is mushy.

EXAMPLE 34

All factors in the various steps in the formation of an excellent, textured proteinaceous product should be controlled, but perhaps the one most important individual step is related to the conditions used for puffing. It is desirable to obtain a fine-grained, uniform-celled, readily edible product having a good textured character in the dry state, when hydrated in water (hot or cold) or when retorted at high temperatures.

The composition shown in Table XIX below is well mixed.

TABLE XIX

| Material | Amount |
| --- | --- |
| Neutralized Defatted Soy Protein Concentrate[1] | 25 lbs. |
| Zeolex 23A | ½ lb. |
| Dicalcium Phosphate Dihydrate | ½ lb. |
| Added Water | 12.5 lbs. |

[1]Neutralized with NaOH, has a pH of 7–7.1, has about 4–5% moisture, and is made in accordance with U.S. Patent 2,881,076.

The composition of Table XIX about has a moisture content of about 37% and a pH of about 7. The product is extruded using a laboratory Brabender extruder with a 3:1 compaction screw which rotates at 95 rpm., a heated barrel temperature of 130°C., and a die temperature of 165°C. The air-cooled (after the start-up) pipe extension is described in Example 33 above.

The ejected, non-puffed, glassy product is air-dried to a moisture content of about 15%.

The partly dried, glassy extrudate is puffed in a puffing gun of The Quaker Oats Company which is used to make puffed cereal. Briefly, that gun includes a sealable, elongated, tubular pressure chamber into which the partly dried, glassy extrudate is placed. The chamber is sealed, rotated along its elongated axis, live steam at about 380°F. and about 220 psi. pressure is introduced into the chamber until the chamber reaches a prescribed pressure and temperature for a prescribed period of time; and when the chamber is opened and the pressure is suddenly released, the product puffs.

Table XX below shows the effect of some of the puffing conditions on the resulting puffed product.

TABLE XX

| Test No. | Lbs. Pressure In The Chamber (Psi.) | Retention Time in the Chamber | Observation of the Puffed Product |
| --- | --- | --- | --- |
| 1 | 220 | 2½ min. | Product burns and has the appearance of chocolate with a porous structure. |
| 2 | 210 | 15 sec. | Product puffs very well and has a fine, open-grained textured structure. Very light in color. Puffs to the very tip. |
| 3 | 200 | 15 sec. | Partially puffed, but has a hard unpuffed core in the center. |
| 4 | 175 | 15 sec. | Very slight puffing. |
| 5 | 150 | 15 sec. | Almost no puffing. |

The results shown in Table XX above point out that with a glassy extrudate made with the composition shown in Table XIX above, the puffing conditions are important. Test 2 in Table XX is the only test shown therein in which the indicated chamber pressure is reached in the indicated retention time, whereupon the chamber is opened to release the pressure suddenly and puff the product.

EXAMPLE 35

The composition shown in Table XXI below is prepared.

TABLE XXI

| Materials | Amount |
| --- | --- |
| Neutralized Defatted Soy Protein Concentrate[1] | 150 lbs. |
| Zeolex 23A | 3 lbs. |
| Dicalcium Phosphate Dihydrate | 3 lbs. |
| Added Water | 75 lbs. |

[1]Neutralized with NaOH, has a pH of 7–7.1, has about 4–5% moisture, and is made in accordance with U.S. Patent 2,881,076.

The dry ingredients of Table XXI above are added to a blender and the added water is sprayed onto the mass during blending to give a uniform mix.

The mix is extruded with a commercial-type Prodex extruder having a 2½ inch diameter and a 2:1 compaction screw about 5 feet long which rotates at 120 rpm. The extruder has four, progressive heating zones at temperatures of 130°C., 150°C. 160°C. and 165°C., respectively. The gate region (between compaction screw and die) and die are electrically heated and maintained at a temperature of about 150°C. An extension or nose which communicates with and extends from the restricted die opening has an overall length of about 25 inches, has an elongated passageway therein which is circular and has a diameter of about ¾-inch at its inner end which communicates with the die opening; that passageway flattens out towards its outer, discharge end so that the ejected extrudate is about 2 inches wide and has a height of about 3/32-inch. The extension has a jacket which allows live steam to be introduced thereto so that the extension can be heated to about 150°C. at the start-up to allow the moist, compressed, translucent to glassy product to be extruded therethrough without congealing and retarding the throughput; however, after the start-up and in producing the desired, unpuffed, moist, compressed, translucent to glassy, ribbon-shaped extrudate, the extension or nose is cooled by circulating cooling water through the jacket.

The unpuffed, moist, compressed, translucent to glassy, rod-shaped extrudate is air-dried at room temperature to a moisture content of about 15%.

The partly dried product is puffed in a microwave oven, as described in Example 32 above, for about 30 seconds. The puffed, translucent to glassy product expands in volume about eight-fold (as compared with the unpuffed state), and has a good, cellular, substantially uniform, fine texture. When subjected to boiling water or retorting temperatures, the puffed product retains its shape and has excellent eating qualities.

The foregoing detailed description has been given for clearness of understanding only, and no unnecessary limitations should be understood therefrom, as modifications will be obvious to those skilled in the art.

We claim:

1. The method of preparing a textured, puffed, proteinaceous food product comprising subjecting water-moistened, hydrophilic proteinaceous material having a protein content of at least about 30% on a dry weight basis and an effective amount of water within the range of about 10 to 50% to working under effective mechanical pressure and sufficient temperature conditions of more than about 100°C. to convert it to a hot, moist, plastic extrudable mass and extruding said hot plastic mass through and from a length of an elongated die under non-puffing conditions to provide a moisture-containing, unpuffed, substantially homogeneous, translucent to glassy, extruded product, recovering said extruded product, and, as a separate and distinct operation, thereafter puffing said recovered product in a moist state by subjecting it to water-boiling puffing conditions.

2. The method of claim 1 wherein said proteinaceous material comprises defatted soy protein.

3. The method of preparing a textured, puffed, proteinaceous food product comprising subjecting water-moistened, hydrophilic proteinaceous material having a protein content of at least about 30% on a dry weight basis and an effective amount of water within the range of about 10 to 50% to working under effective mechanical pressure and sufficient temperature conditions of more than about 100°C. to convert it to a hot, moist, plastic extrudable mass and extruding said hot plastic mass through and from a length of an elongated die under non-puffing conditions to provide a moisture-containing, unpuffed, substantially homogeneous, translucent to glassy, extruded product, recovering said extruded product, and, as a separate and distinct operation, drying said recovered product under non-puffing conditions to reduce its moisture content but leave residual moisture, and, as a separate and distinct operation, thereafter puffing said dried product having residual moisture by subjecting it to water-boiling puffing conditions.

4. The method of claim 3 wherein said proteinaceous material comprises defatted soy protein.

* * * * *

UNITED STATES PATENT AND TRADEMARK OFFICE
CERTIFICATE OF CORRECTION

PATENT NO. : 3,978,236
DATED : August 31, 1976
INVENTOR(S) : Louis Sair and Donald W. Quass It is certified that error appears in the above-identified patent and that said Letters Patent are hereby corrected as shown below:

Title page, first column, the first line immediately below the line designation "[60]", delete the comma [,] between "abandoned" and "which" and substitute a period [.], and in that same line delete "which is a continuation-in-part of Ser."; title page, first column, the second through the fourth lines immediately below the line designation "[60]", delete "No. 750,025, Aug. 5, 1968, abandoned, which is a continuation-in-part of Ser. No. 349,735, March 5, 1964, Pat. No. 3,440,054."; title page, second column, first line below "ABSTRACT" appearing in the line designation "[57]", insert a comma [,] after "puffed"; column 1, line 33, insert quotes around each of the values "10.4" and "12.8", so that those values read as --"10.4"-- and --"12.8"--, respectively; column 1, line 52, change "waterboiling" to --water-boiling--; column 3, lines 58 and 66, in each of those lines change "my" to --our--; column 6, line 41, insert a comma [,] after "45%"; column 9, line 2 of the first full paragraph immediately following the entries of "TABLE I", change "then" to --Then--; column 15, line 3, change "in" to --is--; and, column 16, first column of "TABLE XV", third line under "Materials", change "mesh" in "200-mesh" to --Mesh--.

Signed and Sealed this

Eighteenth Day of January 1977

[SEAL]

Attest:

RUTH C. MASON
*Attesting Officer*

C. MARSHALL DANN
*Commissioner of Patents and Trademarks*